Aug. 16, 1960  S. H. LOGUE  2,949,603
RELATIVE DISTANCE AND MOVEMENT INDICATOR
Filed Feb. 18, 1957  2 Sheets-Sheet 1
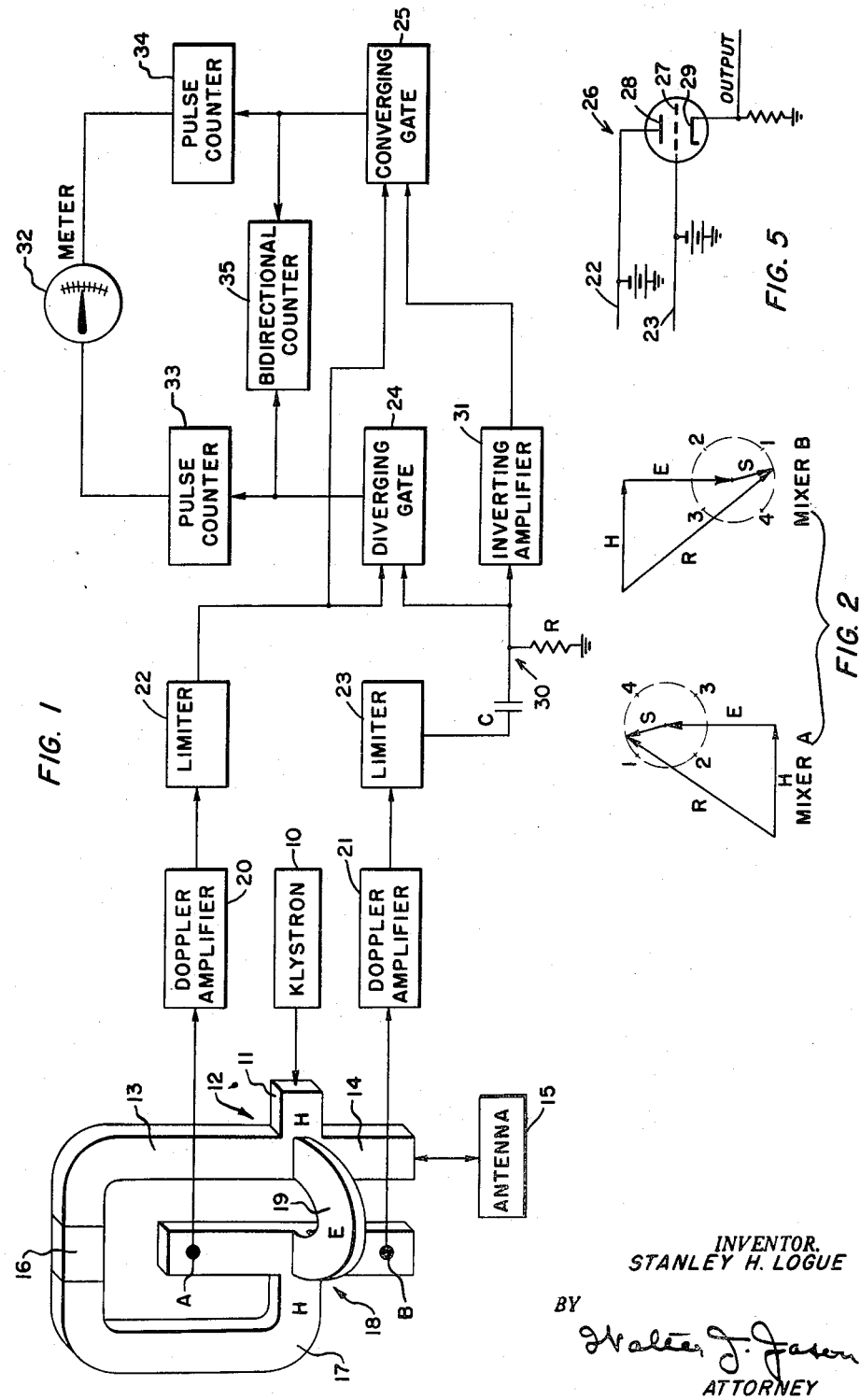
INVENTOR.
STANLEY H. LOGUE
BY
ATTORNEY Aug. 16, 1960 S. H. LOGUE 2,949,603
RELATIVE DISTANCE AND MOVEMENT INDICATOR
Filed Feb. 18, 1957 2 Sheets-Sheet 2
FIG. 3
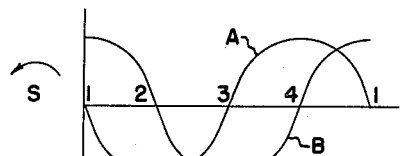
A LEADS B 90°
(DISTANCE DECREASING)
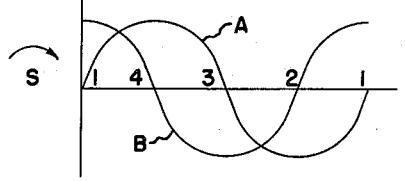
B LEADS A 90°
(DISTANCE INCREASING)
FIG. 4
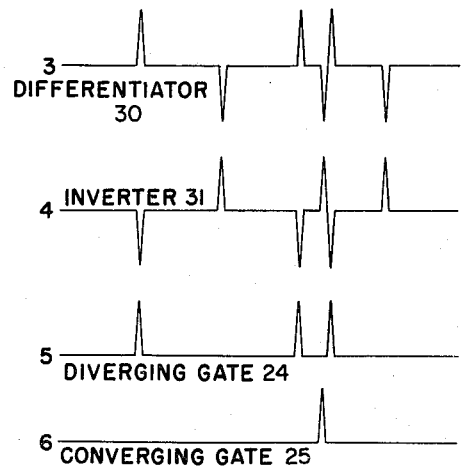
INVENTOR.
STANLEY H. LOGUE
BY
ATTORNEY United States Patent Office 2,949,603
Patented Aug. 16, 1960

2,949,603

RELATIVE DISTANCE AND MOVEMENT INDICATOR

Stanley H. Logue, San Diego, Calif., assignor to General Dynamics Corporation, San Diego, Calif., a corporation of Delaware Filed Feb. 18, 1957, Ser. No. 640,701

12 Claims. (Cl. 343—9)

This invention relates to relative distance and movement indicators and more particularly to such an indicator using radar doppler principles to provide a rapid indication of distance and magnitude and direction of velocity between an object and reference point.

Heretofore velocity indicators using continuous wave radar with doppler were used for velocity indication but the doppler frequency did not indicate in which direction the target was moving. This limited the use of such devices, for example, in take-off and landing of vertical take-off aircraft.

The relative distance and movement indicator comprising the present invention is essentially a continuous wave doppler radar system for use in airborne craft which converts doppler frequency into digital information. A dual channel microwave receiving system is used in determining distance and whether the craft is moving away from or toward an object and the velocity of this relative movement. Limiters are used to provide immunity from changes in signal level and in conjunction with a gating system prevent a gradual decrease in velocity indication as the return signal fades. Gates in the two channels sort the "diverging" cycles of doppler frequency, i.e., decreased frequency, from the "converging" cycles or increased frequency. The gate outputs are connected to pulse counters which produce direct current outputs proportional to the number of input pulses. A meter is placed between the counters and measures the difference between their outputs. "Diverging" gate pulses deflect the meter upward to show the velocity of the objects away from each other and the "converging" gate pulses deflect the meter downward to show the velocity of convergence.

The gate outputs are also connected to a bidirectional counter which integrates the velocity pulses with time to register distance from a reference point. Pulses from the "diverging" gate are added in the counter to show an increase in distance and pulses from the "converging" gate are subtracted to show a decrease in distance.

It is therefore an object of this invention to provide for a new and improved distance and relative movement indicator.

Another object is the provision of apparatus for changing doppler frequency into digital information.

Another object is the provision of apparatus for determining the distance of an object from a reference point and its relative velocity with respect thereto in one of two opposite directions.

Another object is the provision of a dual channel microwave receiving system in determining from doppler frequencies whether an object is moving in one of two opposite directions.

Another object is the provision of a dual channel microwave receiving system in determining from doppler frequencies the distance of an object from a reference point.

Another object is the provision of suitable apparatus for receiving target signals, converting information therefrom into pulses, separating the pulses into "converging" and "diverging" channels and comparing the pulse repetition rates of the two channels to obtain relative converging or diverging velocity and direction, and distance of an object from a reference point.

It is another object of this invention to provide for a new and improved rate-of-climb meter.

Another object is the provision of a rate-of-climb meter using radar doppler principles.

Another object is the provision of a radar rate-of-climb meter wherein changes in signal level within its range of operation do not distort the velocity indication.

Another object is the provision of a rate-of-climb meter having instantaneous response and operable from zero altitude.

Another object is the provision of a rate-of-climb meter wherein altitude from a reference point is indicated.

Another object is the provision of a suitable apparatus for comparing a signal frequency with a reference frequency to determine the frequency difference and whether this difference frequency is positive or negative.

Other objects and features of the present invention will be readily apparent to those skilled in the art from the following specification and appended drawings wherein is illustrated a preferred form of the invention, and in which:

Figure 1 is a diagrammatic presentation of the indicator system;

Figure 2 shows the vector relationships between mixer inputs;

Figure 3 shows mixer output waveforms;

Figure 4 shows typical waveforms at various stages in the system; and

Figure 5 shows a cathode follower type gate used in passing signals.

As shown in Figure 1, the power source is a Klystron 10 although other types of energy generating devices may be used. The generated power enters the H arm 11 of waveguide magic T 12 where it divides between the two side arms 13, 14. One half of the power is transmitted out through an Antenna 15 connected to side arm 14, while the other half goes into an attenuator pad within arm 16 and then to the H arm 17 of a second magic T 18. Here it divides again and enters two crystal mixers A and B. The H arm voltages between the two mixers are in phase. The unavoidable cross-coupling between the H arm 11 and E arm 19 of the first magic T 12 is adjusted to a satisfactory level and used to provide a local signal which passes to the E arm 19 of the second magic T 18. E arm 19 joins one T to the other. This signal also divides between the two crystal mixers A, B where it differs in phase by 180°, due to the basic property of magic T 18. Thus local oscillator power is supplied to each mixer both in phase and out of phase with the other mixer from the E and H arms, 19 and 17, of the second T 18. It should be noted that the E and H arm local oscillator voltages, as shown in Figure 2, are of equal amplitude and differ in phase by 90°. This phase difference is obtained by proper choice of waveguide path lengths.

The weak target-reflected signal is received by the Antenna 15 and passes to the first magic T 12. Here it divides between the E arm 19 and side arm 13 of the T. A portion of the return signal also goes into the H arm to the klystron where it is lost. The side arm signal is lost through attenuation and the E arm signal passes through the E arm 19 of the second T 18 where it divides between the two mixers, A and B, 180° out of phase. This reflected signal is shown in Figure 2 as S. Since this signal S differs in phase from the two local oscillator signals due to the Doppler frequency, its vector representation will rotate relative to the E and H vectors at the Doppler rate. Increasing distance results in a lower S frequency, causing it to rotate clockwise and diminishing distance results in a higher S frequency causing counterclockwise rotation. As shown in Figure 3 the output voltage from mixer A leads that from mixer B by 90° when S rotates counterclockwise and the distance is diminishing. The voltage output from mixer B leads that from mixer A when S rotates clockwise and the distance is increasing. Thus the phase between the two signal channels indicates the direction of the velocity. Suitable circuitry for making this comparison is shown in block diagram form in Figure 1.

The signals from the mixers are now increased by a Doppler Amplifier 20, 21 in each channel to suitable levels to operate respectively the amplitude Limiters 22 and 23. These limiters make system operation independent of signal amplitude within their operating range. Their triggering levels are set to prevent spurious meter indications in the absence of signal due to noise. The limiters operate a set of Gates 24, 25 which sort the faster Doppler frequencies from the slower Doppler frequencies. Each gate consists of a cathode follower 26, shown in Figure 5, in which the cathode current is kept at zero in two ways. The grid 27 is biased negatively below cutoff, and the plate 28 is negative with respect to the cathode 29. Both grid and plate voltages must increase in the positive direction to produce an output from the gate. The square wave output from Limiter 22, shown in Figure 4, is applied to the plates 28 of both gates. The output of Limiter 23 is differentiated by an R-C network 30 to produce narrow pulses which go to the grid of the "Diverging" gate 24. The output of Limiter 23 is also inverted in polarity by an Inverting amplifier 31 and applied to the grid of the "Converging" gate 25. Only when the outputs from Limiter 22 and the R-C differentiator 30 are in positive direction will pulses go through the "Diverging" gate 25. Also, the outputs from Limiter 22 and the Inverting amplifier 31 must be in the positive direction for pulses to pass through the "Converging" gate 25.

Figure 4 shows the typical waveforms associated with the gates when the target and Antenna 15 are moving apart. Here the first waveform is the output of Limiter 22 shown as leading the second waveform which is the output of Limiter 23. This output is differentiated as shown by waveform 3 and applied to the "Diverging" gate 24. Only those positive pulses occurring in time when the first waveform is positive will pass through as shown in waveform 5. Waveform 3 is inverted as shown by waveform 4. Here again those positive pulses occurring in time when the first waveforms are positive will pass through, as shown by waveform 6. The effect of noise in Limiter 23 is shown as resulting in an extra pulse in waveform 5 and an extra pulse in waveform 6 since the noise pulse occurred when the waveform from Limiter 22 was positive. However, these produce equal and opposite forces which later will be cancelled out and result in no net deflection of the Meter 32. The noise in Limiter 22 produces no pulses to pass through the gates and thus does not deflect the meter.

If the pulses from Limiter 23 were leading the pulses from Limiter 22, as in the case when the distance were decreasing, the positive pulses would appear on waveform 6. Only noise pulses would appear on waveform 5 which would also be shown on waveform 6 and be cancelled out without disturbing the readout, Meter 32, as will hereinafter be explained.

The gate outputs go to Pulse counters 33, 34 that produce direct current outputs proportional to the number of input pulses per second. A zero-center-scale microammeter 32 is connected to both counters in such manner that pulses from one Gate 24 deflect the meter in one direction and pulses from the other Gate 25 deflect the meter in the other direction. In this manner not only is the velocity indicated but also its direction.

The gate outputs may also be used to measure the actual distance from the Antenna 15 to the target if the original distance is known. This is done by connecting the gate outputs to a Bidirectional counter 35 in such manner that as the distance is increased the pulses are added by the counter and as the distance is decreased the pulses are subtracted. If the initial distance is more than zero, this distance must be added to the reading or added to the counter in some conventional manner to compensate for this initial distance. This counter, of course, contains a suitable readout device for the operator's use.

The circuitry within the block diagrams in Figure 1 are of conventional design readily understood by those skilled in the art and further discussion or description of these parts is not thought to be necessary. Illustrations of limiting and differentiating are shown on page 170 and gating and counting are shown on pages 229–232 of Radar Electronic Fundamentals, Navships 900,016 published June 1944 by Bureau of Ships, U. S. Navy Department. The art of using balanced mixers with a magic T is taught on page 16 of "Microwave Receivers," Radiation Laboratory Series No. 23 published in 1948 by McGraw-Hill Book Company. The klystron power supply, amplifiers, and meters are of conventional design and readily available on the market from numerous sources.

While the principles of this invention have wide application in missile guidance and control, temperature and frequency measurement apparatus, and moving target detection, they were first incorporated in instrumentation for assistance in the take-off and landing of Vertical Take-Off (VTO) aircraft. Here it was desired for the pilot to know the rate of ascent or descent and his distance from the ground. The complete unit, except for the cockpit readout devices or indicators, was housed in a portion of one wing pod.

Provision is also made to indicate malfunctioning of the equipment, since a zero reading of the meter normally indicates the plane is hovering and not moving relative to the ground. To avoid misleading the pilot in this respect the Meter 32 has a red flag which will show when the total power supplied to the radar is appreciably higher or lower than the normal power consumption. When the power supply changes its output voltage or the klystron currents or voltages change from their nominal values, relays close to actuate the red indicator flag to warn of faulty operation.

This device has been compared with a barometric rate-of-climb meter and altimeter and has been found to be far superior because (a) the system is not sensitive to air turbulence (b) the system works to zero altitude (c) Doppler frequency is an accurate and direct indication of velocity (d) frequency is more easily and accurately measured than most other electrical quantites, and (e) the frequency of a signal is not altered by amplifier distortions or distance from the target.

While certain preferred embodiments of the invention have been specifically disclosed, it is understood that the invention is not limited thereto as many variations will be readily apparent to those skilled in the art and the invention is to be given its broadest possible interpretation within the terms of the following claims:

I claim:

1. Means for comparing the frequency of continuous wave transmitted signals with echo return signals to determine the velocity of a target and its movement relative to said means comprising a two channel receiving system, means connected thereto for mixing said echo return signals with portions of said transmitted signals in a predetermined manner so as to pass signals in one of said channels out of phase with signals in the other of said channels in such manner that lead signals in one of said channels indicate a higher echo return signal frequency and lead signals in the other of said channels indicate a lower echo return signal frequency than the frequency of said transmitted signals, and counter means connected to said channels for comparing the number of lead signals in one channel with the number of lead signals in the other channel.

2. A radar rate-of-climb meter and altimeter comprising means for transmitting continuous wave energy toward the ground and receiving return echo signals therefrom, means applying said energy and said signals to first and second conducting channels in such manner that signals in said first channel lead in phase signals in said second channel when said meter is moving upwardly from the ground and signals in said first channel lag in phase signals in said second channel when said meter is moving downwardly toward the ground, gating and sorting means including a first and second gate connected to both said channels, said gates being conducting when signals in said first channel are applied thereto, one of said gates passing signals indicative of signals in said second channel leading in phase signals in said first channel, the other of said gates passing signals indicative of signals in said second channel lagging in phase signals in said first channel, and indicating means connected to both said gates comparing their outputs, said indicating means comprising a memory device sensitive to the total difference in the number of pulses from said gates for indicating altitude from starting point and a non-memory device sensitive to instantaneous differences in pulse outputs from said gate to indicate rate-of-climb and rate-of-descent velocity.

3. Means for producing signals out of phase to two signal channels during relative movement between two objects comprising a source of continuous wave energy carried by one of said objects, means for directing a portion of said energy on the other of said objects and receiving energy reflections therefrom, two signal mixers one of which is connected to one of said channels and the other of said mixers is connected to the other of said channels, means for directing a second portion of said continuous wave energy to said mixers in phase with each other, means directing a third portion of said continuous wave energy to said mixers approximately 90° out of phase with said second portion at one of said mixers and approximately 270° out of phase with said second portion at the other of said mixers, and means for directing said energy reflections from said other of said objects to said mixers 180° out of phase with each other, each of said mixers having a voltage output indicative of the resultant of the input energy thereto.

4. Means for producing signals out of phase to two signal channels during relative movement between two objects comprising a source of continuous wave energy carried by one of said objects, two signal mixers connected respectively to said signal channels, three energy paths connecting said source to said mixers, the first of said paths having means therein for directing signals from said source to said mixers in phase, the second of said paths having means therein for directing signals from said source out of phase to said mixers and out of phase with signals in said first path, the third of said paths including means for directing signal energy to the other of said objects and receiving energy reflections therefrom and means for directing said energy reflections out of phase to said mixers, said mixers producing out of phase signals in said channels indicative of the resultant of signals applied thereto.

5. Means for producing signals out of phase to two signal channels as in claim 4 wherein the three energy paths comprise a first and second magic T, a transmitting and receiving antenna and waveguide connections therebetween, said first and second magic T having three H arms and an E arm, said first magic T being connected by an H arm to said source, a second H arm connected to said antenna, a third H arm connected to an H arm of said second magic T by a length of waveguide connection to form an H path, the E arms of both magic T's being connected by a length of waveguide connection to form an E path, the length of said H path relative to the length of said E path being such that signals in said H path are approximately 90° out of phase with signals in said E path, said mixers being mounted in the remaining H arms of said second magic T.

6. Means for producing signals out phase to two signal channels as in claim 4, and means in said H path for attenuating signals therein to the amplitude of signals in said E path.

7. Means for comparing the phase of continuous wave transmitted signals with return echo signals comprising a source of energy signals, means for transmitting said signals toward a target, a pair of signal mixers, means for directing part of said energy signals to said mixers both in phase and out of phase in a predetermined manner, means for receiving return echo signals from said target and directing said signals out of phase to said mixers, a pair of signal channels each connected to said mixers, and means connected to said channels for indicating in which channel the signals lead the signals in the other channel and conversely in which channel the signals lag the signals in the other channel.

8. Means for comparing the phase of continuous wave transmitted signals with return echo signals as in claim 7, said indicating means including a readout device, a signal gating and sorting system having two electrical outlets connected in opposition to said readout device to indicate the difference in output of said outlets, said signal gating and sorting system comprising a first and second electrical gate both connected to each of said channels in such manner that signal pulses in one of said channels render said gates signal conducting, said system including means in the other of said channels for generating short pulses indicative of leading and lagging edges of signal pulses in said last named channel and sorting means for directing leading edge pulses to one of said gates and lagging edge pulses to the other of said gates.

9. Means for comparing the phase of continuous wave transmitted signals with return echo signals as in claim 8, said readout device adapted to indicate leading edge pulses passing from one of said gates as velocity of said target away from said phase comparing means and lagging edge pulses passing from said other of said gates as velocity of said target toward said phase comparing means.

10. Means for comparing the phase of continuous wave transmitted signals with return echo signals as in claim 8, said readout device adapted to indicate an accumulative difference in pulse outputs from said gates in terms of distance of said target to said phase comparing means.

11. A gating and sorting system for indicating lead and lag pulse signals applied thereto from two signal channels comprising a pair of limiters, one in each channel, a pair of electrical gates connected to said channels, each of said gates requiring signals of positive polarity from each of said channels to pass a signal pulse in the output, said gates being in signal conducting condition when positive signals of one of said channels are applied thereto, means differentiating the limited signal pulses in the other of said channels to provide sharp pulses at the leading and trailing edges thereof, said gates being connected in parallel to said other channel at a point beyond said differentiating means, one of said gates receiving positive sharp pulses, inverting means in the path between said point and the other of said gates converting negative pulses to positive pulses, and means connected to both said gates for comparing their outputs.

12. A gating and sorting system as in claim 11 wherein said gates do not pass noise signals from said one channel and pass only positive noise pulses from said other channel through both said gates when said gates are in operation condition, said gate output comparing means thereby being insensitive to spurious noise signals.

References Cited in the file of this patent

UNITED STATES PATENTS

| | | |
|---|---|---|
| 2,524,610 | Storm | Oct. 3, 1950 |
| 2,558,758 | Jaynes | July 3, 1951 |
| 2,858,425 | Gordon | Oct. 28, 1958 |

OTHER REFERENCES

Direction Sensitive Doppler Device, by H. P. Kalmas, Proceedings IRE, vol. 43, No. 6, June 1955, pp. 698–700.